US006805726B1

(12) United States Patent
Wolf

(10) Patent No.: US 6,805,726 B1
(45) Date of Patent: Oct. 19, 2004

(54) METHOD FOR PRODUCING A POWDER

(75) Inventor: Gerhard Wolf, Hirschau (DE)

(73) Assignee: Applikations - und Technikzentrum fur Energieverfahrens- Umvelt- und Stromungstechnik (Atz-Evus), Sulozbach-Rosenberg (DE)

( * ) Notice: Subject to any disclaimer, the term of this patent is extended or adjusted under 35 U.S.C. 154(b) by 82 days.

(21) Appl. No.: 10/110,429

(22) PCT Filed: Oct. 11, 2000

(86) PCT No.: PCT/DE00/03573

§ 371 (c)(1),
(2), (4) Date: Jun. 11, 2002

(87) PCT Pub. No.: WO01/26853

PCT Pub. Date: Apr. 19, 2001

(30) Foreign Application Priority Data

Oct. 15, 1999 (DE) .......................... 199 49 872
Jan. 18, 2000 (DE) .......................... 100 01 968

(51) Int. Cl.[7] .................................. B22F 9/08
(52) U.S. Cl. ..................... 75/338; 75/339; 264/12
(58) Field of Search ........................ 75/338, 339; 264/5, 264/12

(56) References Cited

U.S. PATENT DOCUMENTS

| 4,135,922 A | * | 1/1979 | Cebulak | |
| 4,534,917 A | * | 8/1985 | Walz | 264/12 |
| 4,540,546 A | | 9/1985 | Giessen | |
| 5,090,997 A | * | 2/1992 | Birkenstock et al. | 75/338 |
| 5,368,657 A | * | 11/1994 | Anderson et al. | 75/338 |
| 5,609,799 A | * | 3/1997 | Shima et al. | 264/12 |
| 6,444,009 B1 | * | 9/2002 | Liu et al. | 75/338 |
| 2002/0134198 A1 | * | 9/2002 | Edlinger | 75/338 |

FOREIGN PATENT DOCUMENTS

| DE | 1 029 571 B | 5/1958 |
| DE | 195 23 922 A1 | 10/1996 |
| EP | 0 230 959 A | 8/1987 |

* cited by examiner

Primary Examiner—George Wyszomierski
(74) Attorney, Agent, or Firm—Rankin, Hill, Porter & Clark LLP

(57) ABSTRACT

A method for producing a powder by pulverizing a stream of molten metal using a pulverization gas, which directly hits the molten metal stream, whereby a) a reactive gas is used as the pulverization gas such that a compound is formed by the reaction of the pulverization gas with the metal or an alloy component thereof and b) the temperature of the pulverization gas and the cooling speed are set such that the metal or the alloy component thereof is converted into the compound, to a substantial degree completely, in one step.

18 Claims, 2 Drawing Sheets

METHOD FOR PRODUCING A POWDER

The invention relates to a process for producing a powder by atomizing a jet of molten metal by means of an atomization gas which comes into contact with the jet.

The prior art has disclosed what are known as melt atomization processes for the production of fine metallic powders with particle sizes of less than 100 $\mu$m. Processes of this type are disclosed, for example, in DE 35 33 964 C1 and DE-A 1 758 844. Melt atomization processes are based on the principle that a molten jet or film flowing out of a vessel is finely atomized by an atomization gas which comes into contact with the jet or film at a high velocity. In practice, for this purpose the metallic melt and the atomization gas are combined via an external mixing nozzle.

DE 26 39 107 C2 has disclosed a process for producing a composite powder based on silver/cadmium oxide. In this process, a metal melt is atomized using an unreactive, i.e. inert, gas. Then, the powder which has been produced by the atomization is oxidized in a second step.

DE 39 13 649 A1 and DE-A 24 00 026 describe a process for the production of metallic powders from a metal melt by gas atomization. Inert gas is used as atomization gas. DE 28 18 720 discloses a process in which a metal melt is atomized, likewise under protective gas. The metal melt is atomized into metal particles by means of water.

DE-A 24 46 698 describes a process for producing a two-layer contact. In this process, AgNiO powder is obtained by atomization of an AgNi melt. The AgNi powder produced by atomization is oxidized in air for approximately 1 hour after atomization at 800° C.

It is known from DE 39 13 649 C2 for the atomization gas to be preheated in order to increase the gas discharge velocity. Increasing the gas discharge velocity makes it possible to produce finer particles. The known process relates to the production of metallic powders, with an inert gas being used as atomization gas.

DE 40 23 278 A1 has disclosed a process for producing metal oxide powders. In this process, oxygen acts on the molten jet as atomization gas. The atomization gas is taken directly from a high-pressure tank. It is in the liquefied or cold state. A drawback of this process is that the particles are only superficially oxidized, this being sufficient for their use, for example, as a pigment. An only partially reacted powder of this type is unsuitable in particular as a starting material for the production of a metal with predetermined electrical, mechanical, chemical and/or physical properties.

It is an object of the invention to provide a process for producing a predetermined chemical compound in the form of fine particles. A further aim of the invention consists in particular in describing a process which is as efficient as possible for the production of a homogeneous powder for producing electrical contacts.

The invention provides a process for producing a powder by atomizing a jet of molten metal by means of an atomization gas which comes into contact with the jet, in which process a) the atomization gas used is a reactive gas, so that a compound is formed by reaction of the atomization gas with the metal or an alloying constituent thereof, and b) the temperature of the atomization gas and the cooling rate are set in such a way that the metal or the alloying constituent thereof is substantially completely converted into the compound in one step.

By means of the process according to the invention, it is possible to produce a compound in the form of fine particles, the particles having a homogeneous composition through their entire cross section. The particles are converted into a compound of predetermined stoicheometry by the reactive gas as early as during the atomization. The conversion reaction is, for example, an oxidation reaction. It is also possible, under certain circumstances, to produce spherical particles from an alloy, at least one alloying constituent being present in the form of a compound and this alloying constituent being substantially homogeneously distributed through the particle cross section. With the process according to the invention, it is possible in particular to provide powders for the production of metallic contacts with good electrical conductivity combined, at the same time, with a high resistance to electrical erosion and abrasive wear and a reduced tendency to weld together.

According to one configuration, the temperature of the atomization gas is set in such a way that, when it comes into contact with the jet, the temperature is at least 0.3 times the melting point in ° C. of the metal.

The temperature of the atomization gas is advantageously greater than or equal to the melting point in ° C. of the metal. At the selected temperature, the atomization gas effects complete reaction with the metal or an alloying constituent thereof.

According to a further configuration, the cooling rate is less than $10^2$ K/s. The above feature also contributes to complete reaction of the atomization gas with the metal or the alloying constituent.

The compound is advantageously a metal oxide, metal nitride or metal carbide. Accordingly, it is expedient for the atomization gas used to be air, nitrogen, ammonia, oxygen, carbon-containing gas or a mixture thereof. It is also possible for noble gas to be added to the atomization gas or the mixture.

According to a further configuration, the metal may be an alloy formed at least from a first and a second alloying constituent. The first alloying constituent may be held in the molten state in a first vessel, and the second alloying constituent may be held in the molten state in a second vessel, it being possible for the first and second alloying constituents to be mixed in a mixer pipe which leads to the melt outlet opening. Particularly for the production of powders for producing electrically conductive materials for electrical switching contacts, it is expedient for the melt of the first alloying constituent to be saturated with oxygen. In this case, the second alloying constituent can be melted under inert conditions. The first alloying constituent may be silver or copper, the second alloying constituent expediently being tin, indium, bismuth or a mixture thereof.

When the process according to the invention is applied to an alloy having the alloying constituents described above, and when oxygen is used as atomization gas, predominantly fine, spherical particles are formed, which contain a homogeneous distribution of, for example, tin oxide precipitations in a matrix formed from silver. This makes it possible to produce an electrically conductive component, for example by sintering or hot pressing of a powder of this type. The particularly homogeneous distribution of tin oxide in the matrix reduces the likelihood of the material becoming welded to contacts produced therefrom as a result of a spark-over; it has an excellent stability with respect to the electrical erosion and abrasive wear.

It has proven expedient to set the throughput of atomization gas to 1 to 10 m³/min [s.t.p.], the term [s.t.p.] being understood as meaning standard temperature and pressure. The admission pressure of the atomization gas can be set to 1 to 50 bar.

A particularly low cooling rate can be achieved by guiding the metal in a substantially horizontal trajectory at least from time to time during the reaction. For this purpose, and to set the cooling rate, atomization gas can be guided onto the particle stream downstream of the melt outlet opening.

According to a further configuration, the powder is cooled after the compound has been formed. For this purpose, the powder may be acted on by gas, liquefied gas or water. It may be applied either in countercurrent or in the direction of flow. The gas used may be air, oxygen, nitrogen, noble gas or a mixture thereof.

The process according to the invention is explained in more detail below with reference to exemplary embodiments.

A. Production of Powders with a Mean Grain Size of $\leq 10$ $\mu$m.

To produce a compound in the form of a fine, sinter-active powder, the temperature of the atomization gas is selected to be in a range between 0.3 times the melting point in ° C. of the metal and the melting point of the metal. Contact with the atomization gas leads to the compound being formed at the surface of the metal droplets. The compound flakes off in the form of irregularly shaped fragments, until the metal droplet has been completely reacted to form the compound. In this way, it is possible to produce a compound which corresponds to a predetermined stoichiometry from the metal. By way of example, the metal may be completely converted into its oxide.

B. Production of a Powder with Spherical Particles

To produce a powder which is formed from spherical particles, the temperature of the atomization gas is selected to be higher than the melting point of the compound which forms. The compound which is formed after the reaction of the atomization gas with the metal remains in the molten state for a certain time. Spherical particles with a grain size of at most 100 $\mu$m are formed.

C. Production of Particles with a Compound Finely Distributed Therein

To produce a silver powder with oxide precipitations, such as for example $SnO_2$, $In_2O_3$ and/or $Bi_2O_3$, finely distributed therein, silver is melted as first alloying constituent in a first vessel. The silver melt is saturated with oxygen, for example by means of an oxygen lance.

As second alloying constituent, by way of example tin is melted in a second vessel under an inert gas atmosphere.

The first alloying constituent, namely silver, and the second alloying constituent, for example tin, are passed in the molten state, via feedlines, to a common mixer pipe, which leads to an annular nozzle.

In the mixer pipe, the molten first alloying constituent is mixed with the molten second alloying constituent tin. In the process, oxygen is released from the melt of the first alloying constituent. The release of the oxygen results in turbulent and therefore complete mixing of the first and second alloying constituent. The oxygen which is released partially oxidizes the tin even before it leaves the annular nozzle.

The mixture then emerges from the annular nozzle. Immediately after it has emerged, it is acted on by oxygen-containing, preheated atomization gas which emerges through the annular gap of the annular nozzle. The atomization gas is preheated in such a manner that, when it comes into contact with the emerging molten jet, its temperature is in a range between the melting points of the alloying constituents.

As a result of oxygen-containing gas being applied to the molten jet, the second alloying constituent is completely oxidized. At the same time, the molten drop adopts a spherical shape and solidifies to form a particle. The oxidized second alloying constituent is distributed homogeneously over the substantially round particle cross section.

After the second alloying constituent has reacted with the atomization gas, the spherical particles which have been formed pass into a cooling zone, where they are acted on by cooling fluid in countercurrent. The cooling fluid may be gas, water or liquefied gas. The cooled particles are then collected in a collection vessel and removed. By way of example, the atomization gas, ultrafine particles and cooling fluid are extracted via a cyclone separator and are returned to the process, if appropriate after separation and cleaning.

Of course, it is also possible to do without saturating the melt of the first alloying constituent with oxygen. By way of example, spherical copper particles with oxide precipitations can be produced by atomizing a mixture of copper and aluminum under the action of preheated oxygen-containing gas.

An apparatus for carrying out the process is described in more detail, by way of example, with reference to the drawing, in which.

Figure 1:
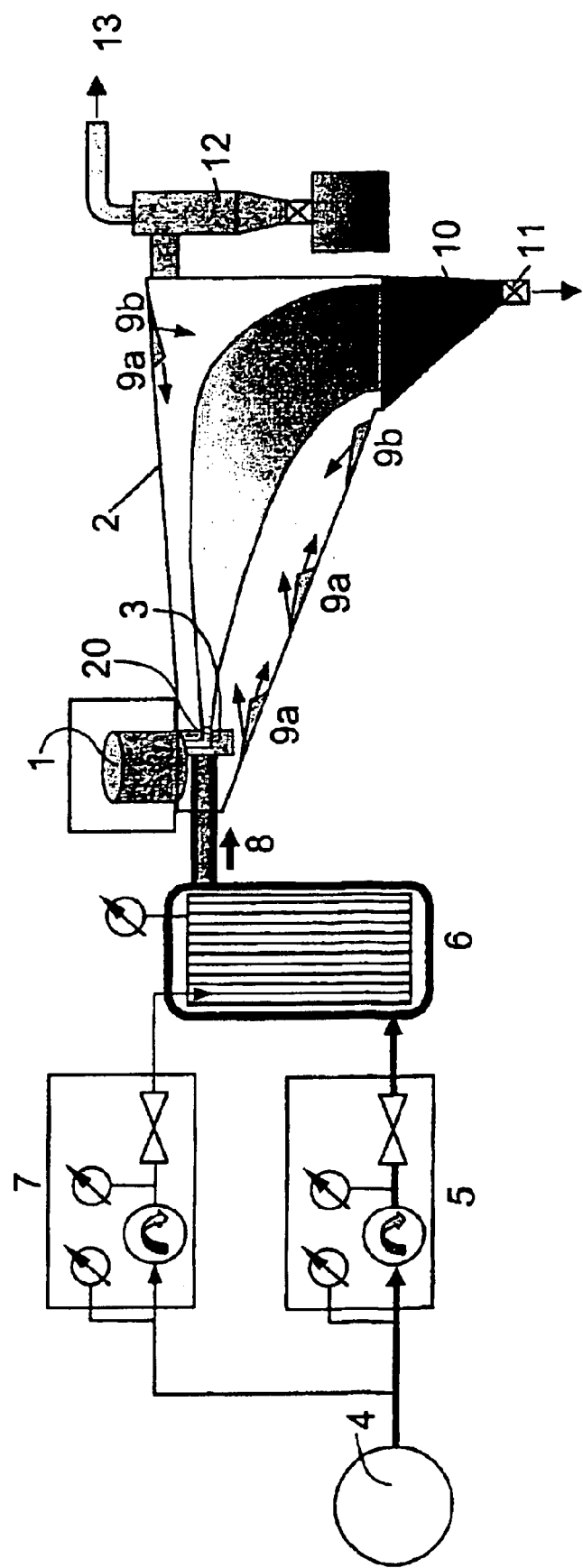
FIG. 1 shows a diagrammatic side view of an atomization installation.

In FIG. 1, 1 denotes a melting apparatus and 2 denotes an atomization chamber. The melting apparatus 1 has a vessel which contains the molten metal which is to be atomized. A feed with a melt discharge opening 20 leads from the vessel into an atomization chamber 2. An atomization gas is located in a pressurized storage tank 4. The atomization gas can be fed to a gas-heating device 6 via a first gas expansion device 5. The gas-heating device 6 may, for example, be a pebble heater. When using a pebble heater, it is furthermore possible for a second gas expansion device 7 to be connected to the gas-heating device 6 in order to control the discharge temperature of the atomization gas. The gas is heated to a predetermined temperature in the gas-heating device 6. The gas-heating device 6 is connected to the annular nozzle 3 via a feed tube 8. The annular nozzle 3 preferably has an annular gap which is arranged close to the discharge for the molten jet. The annular gap concentrically surrounds the melt outlet opening. According to an advantageous configuration, there is provision for the width of the annular gap to be adjustable. In this way, it is possible to regulate gas throughput rates. The gas discharge openings are preferably designed in such a way that the atomization gas comes into contact with the molten-jet axis at an angle of between 0° and 30°, preferably between 10° and 25°. It is also possible to provide individual bores instead of the annular gap.

The reference symbol 9a denotes first nozzles, which are arranged downstream of the annular nozzle 3. Preheated atomization gas is likewise blown onto the particle stream through the first nozzles 9a. The result is that, firstly, the trajectory is kept substantially horizontal and, secondly, the cooling rate of the particles is reduced. 9b denotes second nozzles for supplying coolant. The coolant may be gas, liquefied gas or water. The second nozzles 9b are preferably arranged in such a way that it is possible for the particle stream to bend into a vertical trajectory.

A conical collection vessel is denoted by 10, and a bottom tap by 11. To separate the ultrafine fraction, there is a cyclone separator 12 with downstream cooling device 13.

Figure 2:
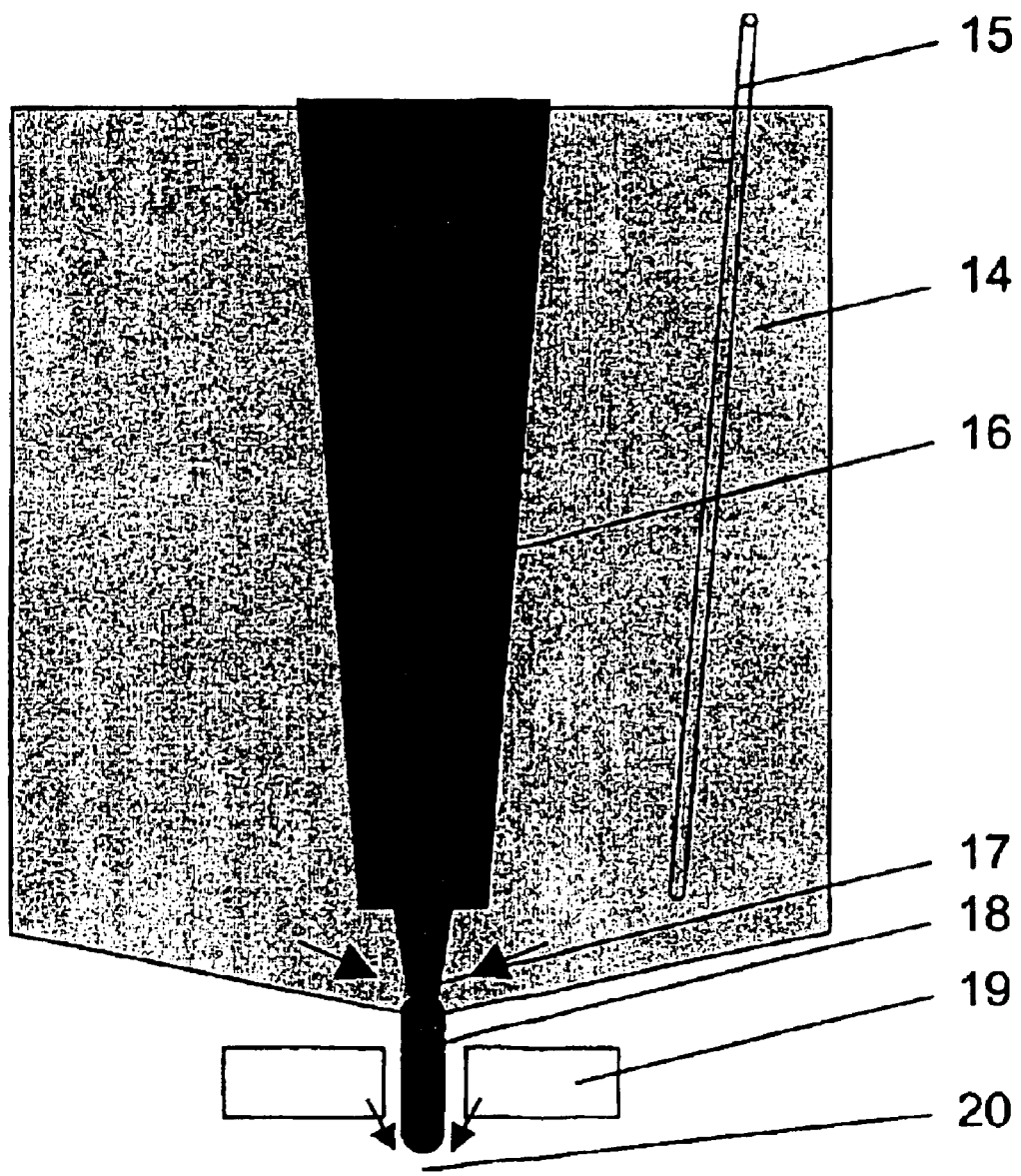
FIG. 2 shows a cross-sectional view of a double vessel.

To produce particles which are formed from a first and a second alloying constituent, it is possible to use the double vessel shown in FIG. 2. It comprises a first vessel 14 and a second vessel 16. 15 denotes a gas lance, which can be immersed in the first vessel 14. The second vessel 16 is closed. It can be purged by an inert gas. A feedline which connects the second vessel 16 to a mixer pipe 18 is denoted by 17. The mixer pipe 18 has a melt discharge opening 20. 19 denotes an annular gap, through which the atomization gas emerges and comes into contact with the molten jet emerging from the melt discharge opening 20 at an angle of approximately 20°.

LIST OF REFERENCE SYMBOLS

1 Melting apparatus
2 Atomization chamber
3 Annular nozzle
4 Atomization vessel
5 First gas expansion station
6 Gas-heating device
7 Second gas expansion station
8 Feed tube
9a First nozzles
9b Second nozzles
10 Collection vessel
11 Bottom tap
12 Cyclone separator
13 Cooling device.
14 First vessel
15 Gas lance
16 Second vessel
17 Feedline
18 Mixer pipe
19 Annular gap
20 Melt discharge opening

What is claimed is:

1. A process for producing a powder by atomizing a jet of molten metal by means of an atomization gas which comes into contact with the jet, comprising the steps of:
   a) using a reactive gas as the atomization gas so as to form a compound by reacting the atomization gas with the metal or an alloying constituent thereof, said compound being in the form of fine particles;
   b) setting a temperature of the atomization gas and a cooling rate such that the temperature of the atomization gas, when said atomization gas comes into contact with the jet, is at least 0.3 times a melting point, in ° C., of the metal and the cooling rate is less than $10^2$ K/s, so that the metal or the alloying constituent thereof is substantially completely converted into the compound in one step, and the particles formed have a substantially homogenous composition consisting essentially of the compound through their entire cross section; and,
   c) cooling the particles after the compound has been formed.

2. The process as claimed in claim 1, wherein the temperature of the atomization gas when it comes into contact with the jet is greater than or equal to the melting point in ° C. of the metal.

3. The process as claimed in claim 2, wherein the atomization gas used is air, oxygen, nitrogen, ammonia, carbon-containing gas or a mixture thereof.

4. The process as claimed in claim 3, wherein noble gas is added to the atomization gas or the mixture.

5. The process as claimed in claim 1, wherein the compound is a metal oxide, metal nitride or metal carbide.

6. The process as claimed in claim 1, wherein the atomization gas used is air, nitrogen, ammonia, oxygen, carbon-containing gas or a mixture thereof.

7. The process as claimed in claim 6, wherein noble gas is added to the atomization gas or the mixture.

8. The process as claimed in claim 1, wherein the metal is an alloy formed at least from a first and a second alloying constituent.

9. The process as claimed in claim 8, wherein the first alloying constituent is held in the molten state in a first vessel (14), and a second alloying constituent is held in the molten state in a second vessel (16), and wherein the first and second alloying constituents are mixed in a mixer pipe (18), which leads to a melt outlet opening (20).

10. The process as claimed in claim 9, wherein the melt of the first alloying constituent is saturated with oxygen.

11. The process as claimed in claim 9, wherein the second alloying constituent is melted under inert conditions.

12. The process as claimed in claim 9, wherein the first alloying constituent is silver or copper.

13. The process as claimed in claim 9, wherein the second alloying constituent is tin (Sn), indium (In), bismuth (Bi) or a mixture thereof.

14. The process as claimed in claim 1, wherein throughput of atomization gas is set to 1 to 10 m³/min [s.t.p.].

15. The process as claimed in claim 1, wherein admission pressure of the atomization gas is set to 1 to 50 bar.

16. The process as claimed in claim 1, wherein the metal is guided in a substantially horizontal trajectory at least from time to time during the reaction.

17. The process as claimed in claim 1, wherein, to set the cooling rate, atomization gas is guided onto the particle stream downstream of the melt outlet opening (20).

18. The process as claimed in claim 1, wherein the powder is acted on by gas or water for cooling purposes.

* * * * *